INVENTORS
LOUIS VOIDA
DONALD H. WILKE
ROBERT E. TAFEL
BY

June 18, 1968  L. VOIDA ET AL  3,388,667
CONTACT FUZE

Filed March 27, 1959  18 Sheets-Sheet 4

DIRECTION OF ACCELERATION FORCES

INVENTORS
LOUIS VOIDA
DONALD H. WILKE
ROBERT E. TAFEL
BY
*Q. Baxter Warner*

DIRECTION OF ACCELERATION FORCES →

INVENTORS
LOUIS VOIDA
DONALD H. WILKE
ROBERT E. TAFEL

BY
*B. Baxter Warner*

INVENTORS
LOUIS VOIDA
DONALD H. WILKE
ROBERT E. TAFEL
BY
*G. Baxter Warner*

INVENTORS
LOUIS VOIDA
DONALD H. WILKE
ROBERT E. TAFEL
BY
*O. Baxter Warner*

INVENTORS
LOUIS VOIDA
DONALD H. WILKE
ROBERT E. TAFEL
BY
*J. Baxter Warner*

June 18, 1968 L. VOIDA ET AL 3,388,667
CONTACT FUZE

Filed March 27, 1959 18 Sheets-Sheet 11

INVENTORS
LOUIS VOIDA
DONALD H. WILKE
ROBERT E. TAFEL
BY

INVENTORS
LOUIS VOIDA
DONALD H. WILKE
ROBERT E. TAFEL
BY
*Q. Baxter Warner*

INVENTORS
LOUIS VOIDA
DONALD H. WILKE
ROBERT E. TAFEL
BY
*G. Baxter Warner*

INVENTORS
LOUIS VOIDA
DONALD H. WILKE
ROBERT E. TAFEL
BY
*Q. Baxter Warner*

INVENTORS
LOUIS VOIDA
DONALD H. WILKE
ROBERT E. TAFEL
BY
G. Baxter Warner

DIRECTION OF ROTATION

DIRECTION OF ACCELERATION FORCES →

INVENTORS
LOUIS VOIDA
DONALD H. WILKE
ROBERT E. TAFEL
BY

DIRECTION OF ACCELERATION FORCES

INVENTORS
LOUIS VOIDA
DONALD H. WILKE
ROBERT E. TAFEL
BY
*J. Baxter Warner*

3,388,667
CONTACT FUZE

Louis Voida, Canoga Park, Donald H. Wilke, Woodland Hills, and Robert E. Tafel, Riverside, Calif., assignors, by direct and mesne assignments, to the United States of America as represented by the Secretary of the Navy
Filed Mar. 27, 1959, Ser. No. 802,586
1 Claims. (Cl. 102—70.2)

This invention relates to a contact fuze for a guided missile and more particularly to a novel contact fuze incorporating the concept of counter rotating weights to nullify the erroneous influence of lateral acceleration forces of the missile as disclosed in the patent application of Wayne E. Phillips Ser. No. 582,607, filed May 3, 1956, now abandoned and entitled Fuze Safety and Arming Device.

The prior contact fuzes employed safety and arming devices which were either a single rotating weight or a sliding weight under the control of the spring or clock mechanism as the integrating device to measure the distance to arming. Other of the devices employed either pressure actuated mechanisms dependent on rocket motor gas pressures to initiate the arming cycle or separate electro-mechanical switching assemblies including a large number of moving parts. The disadvantage of the single rotating or sliding weight devices is that they operate satisfactorily only if the missile flies in a substantially straight course to the armed position. If the missile steers prior to arming, large lateral accelerations occur normal to the line of flight and introduce an error in measurement of distance to arming. In the case of the single rotating weight device the error resolves from the fact that the torque developed by the single rotating weight is not purely a function of acceleration parallel to the line of flight but is a function of the resultant of both the acceleration parallel to the line of flight and lateral acceleration normal to the line of flight. While in the case of the sliding weight the error introduced by lateral acceleration results from an increase in sliding friction between the weight and its guide, also the retarding action in spring or clock mechanisms will further increase the relative error of either the single rotating or sliding weight mechanism mentioned above.

The pressure actuated devices dependent upon rocket motor gas pressures, are extremely temperature sensitive and a variation in temperature of the rocket motor gases will vary in the reaction time of the device, also the gas has to be fed into the device through an orifice which becomes easily fouled by motor gas particles and soon fails to meter the gas properly.

The disadvantages of some of the electromechanical devices are of course obvious since the larged the number of separate moving parts in any device the greater the possibility of a mechanical malfunction either with respect to the interlocking mechanical linkages or to the terminal connections with respective electric components.

The prior fuzing systems themselves also had distinct disadvantages because a contact type fuze in combination with a propeller and shaft safety and arming device is too slow in response to impact and requires too much space for the complicated mechanism. Also the battery or other power sources did not meet the specification requirements for fuzing and safety and arming of a particular missile with any degree of accuracy and reliability.

The present invention in its broadest concept consists essentially of the combination of the electrical storage means, normally a capacitor, connected through a contact or tremblor switch of some variety to a detonator. The detonator is carried in one of a pair of geared together counter-rotating eccentrically weighted rotors which react only to acceleration forces along the line of flight. A sliding G weight reacting to setback due to acceleration along the line of flight having a cam slot therein, is operatively connected to one of the rotors by a pin which is adapted to ride in the cam slot. An escapement mechanism associated with the rotors meters the power from the rotors at an integrating rate corresponding to the acceleration forces to which the missile is subjected. Prior to launching of the missile the rotors are held in a safe position with the detonator out of line with the explosive train by the engagement of the pin on the rotor with a cam slot in the sliding G weight and the weight in turn is locked by a latch. In this position the detonator is out of line with the explosive train and the G weight cannot slide aft until a pair of dimple motors are exploded to release the latch. Also the dimple motors are short circuited prior to launching and the capacitor does not receive any charge until the missile is launched. There is provided an acceleration switch which upon the launching of the missile will remove the short circuit from the dimple motors, fire the dimple motors and supply a charging circuit to the capacitor. When the dimple motors are fired withdrawing the lock from the sliding G weight upon launching, the sliding G weight moves aft due to setback to the commit acceleration point. The relationship of the pin on the rotor with the cam slot at this point is such that the eccentrically weighted rotors are now free to rotate and are subject to axial acceleration forces. The rotors rotate at a velocity allowed by the escapement mechanism until the missile reaches a set integrated distance. After the integrated distance has been reached the rotors are no longer under the control of the escapement mechanism and rotate freely to the armed position and the detonator is now in line with an explosive train completing the arming cycle. Upon contact with the target the charge from the capacitor is passed through the detonator to fire the explosive train either by a tremble switch or other contact switch means.

The principal object of the invention, therefore, is the provision of a new and improved contact fuze for a guided missile incorporating the concept of eccentrically weighted counter-rotating rotors to substantially nullify the erroneous influence of lateral acceleration forces due to steering of the missile during its arming cycle.

A further object of the invention is to provide a contact fuze having a safety and arming device for positively maintaining the detonator out of the explosive train until the missile containing the safety and arming device is launched and the device is acted upon by a predetermined amount of longitudinal acceleration forces.

A still further object of the invention is to provide a contact fuze having a safety and arming device wherein at least two primary mechanisms, each utilizing different physical principals and requiring independent sources of arming energy which must function before the arming can take place.

A still further object of this invention is to provide a contact fuze having a safety and arming device of the character described which cannot be accidentally armed by dropping or jolting and which operates only after a sustained force of setback acts on the device.

A further object of this invention is to provide a device of the character described which is simple in operation and manufacture and positive in action.

Other objects and many of the attendant advantages of this invention will be readily appreciated as the same becomes better understood by reference to the following detailed description when considered in connection with the accompanying drawings wherein.

Figure 1:
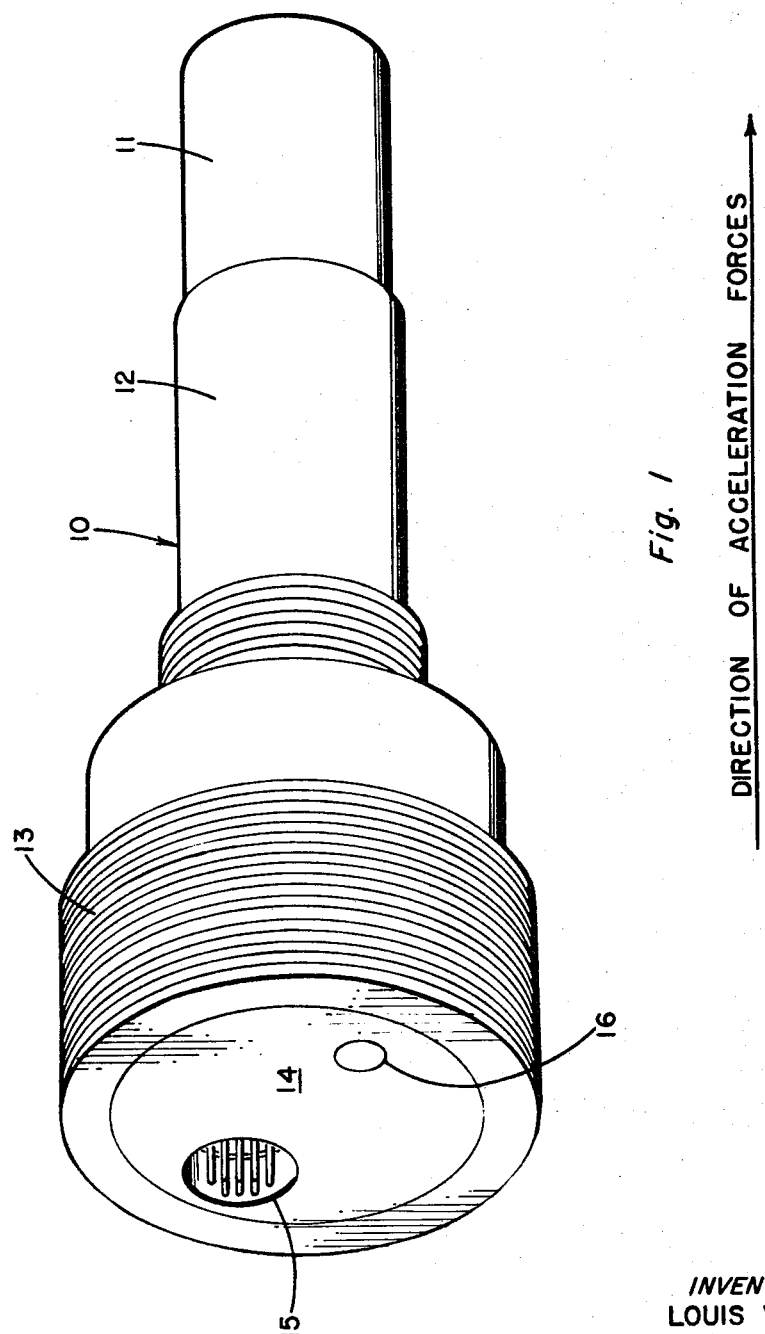
FIG. 1 is a pictorial view of the complete fuze and safety and arming device in its case assembly with a booster charge attached thereto.
Figure 2:
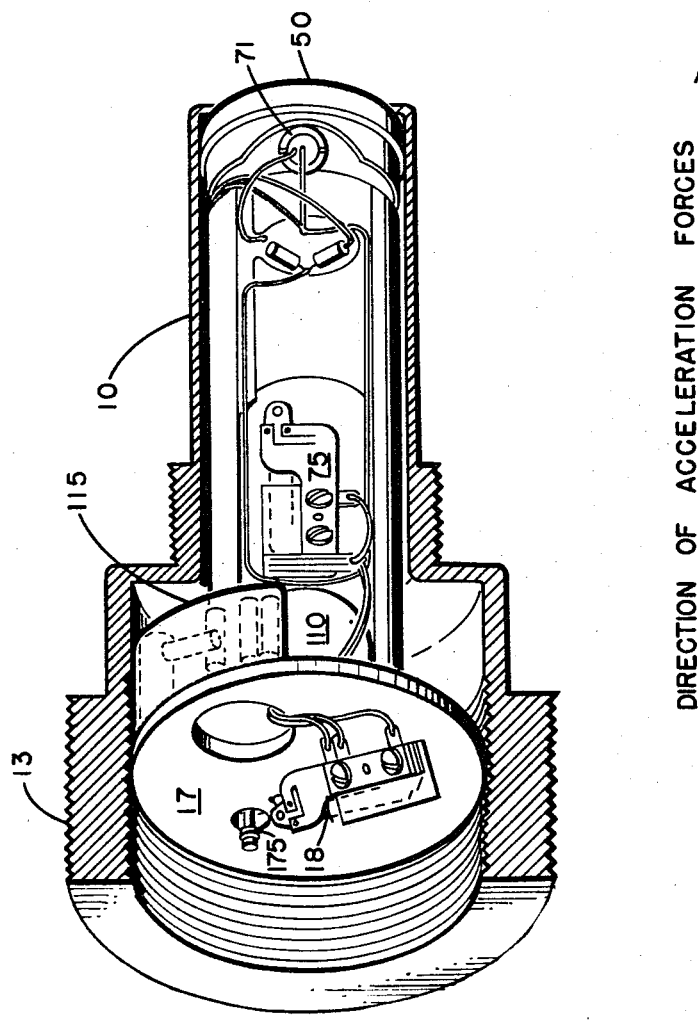
FIG. 2 is a cross sectional pictorial view of the fuze and safety and arming device removed from the case and illustrating part of the electrical circuitry.
Figure 3:
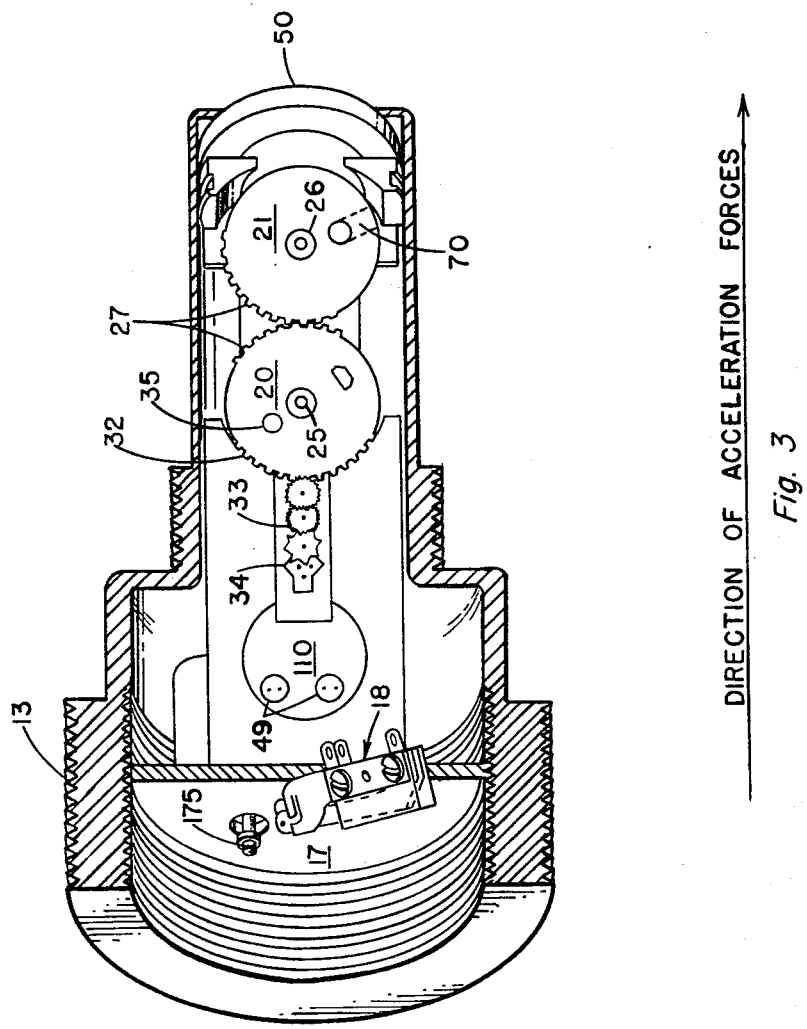
FIG. 3 is a cross sectional pictorial view illustrating the eccentrically weighted counter-rotating weights and escapement mechanism of the safety and arming device.
Figure 4:
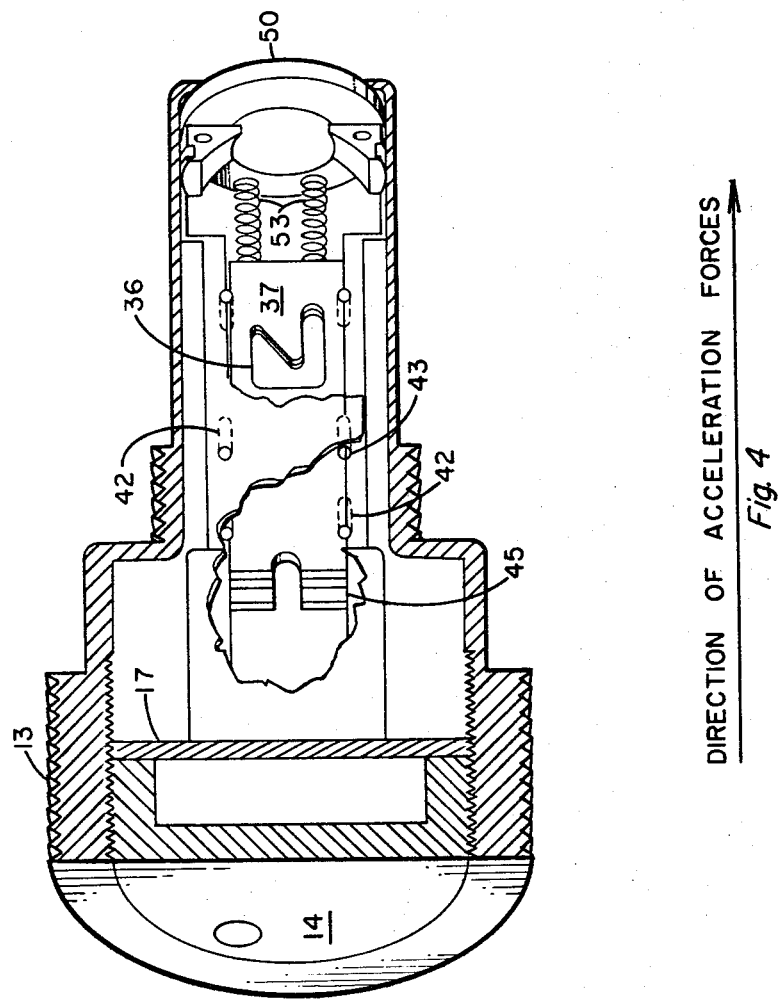
FIG. 4 is a cross sectional pictorial view illustrating the sliding weight cam slot of the safety and arming device.

Referring to the drawings in detail for a more complete understanding of the invention, and more particularly to FIG. 1 wherein the fuze and safety and arming device casing 10 is shown with the booster charge 11 attached at one end. The casing 10 comprises a cylindrical housing 12 at one end thereof and a larger threaded housing 13 at the other end. The end plate 14 of the S and A main body is mounted flush with the end of the enlarged portion 13 of the casing 10. A recessed opening 15 in the plate 14 provides an access for the electrical connections between the electrical circuits of the fuze and the main missile power. Also an indicator window 16 provides a visual sight to the safety and arming indicator hereinafter described. With reference to the schematic sketch shown in FIG. 2, wherein the end plate 14 is removed and a cross section through the casing 10 is taken, a mounting plate 17 has the main body of the safety and arming device connected thereto by any suitable means and provides a mounting surface for the break switch 18.

With particular reference to FIGS. 3 through 9, 15 and 16 the safety and arming device is similar to the safety and arming device disclosed in the application of Louis Voida et al. for Counter Rotating Dual Rotor Safety and Arming Mechanism, Ser. No. 772,152, filed Oct. 7, 1958 and comprises essentially a pair of eccentrically weighted counter rotating rotors 20 and 21 rotatably mounted between upper and lower plates 23 and 24 respectively by stub shafts 25 and 26. In order to incorporate the Phillips concept and nullify the effect of lateral acceleration forces set forth in greater detail in the above named application, Ser. No. 582,607, the rotors 20 and 21 are geared together by suitable teeth 27 around a portion of their circumference and are eccentrically weighted by weights 28 and 29 respectively. The weights 28 and 29 are positioned when the rotors are geared together in their initial position prior to launching, with their centers of gravity on opposite sides of the longitudinal axis of the safety and arming device whereby the longitudinal acceleration forces will rotate the rotors 20 and 21 in opposite directions when they are free to rotate and lateral or steering acceleration forces which tend to reduce the driving torque of one weight will increase the driving torque of the other weight by an equal amount thus substantially nullifying the effect of lateral or steering acceleration forces. The rotor 20 is geared by segment 32 and gear train 33 to an escapement mechanism 34 and due to the reaction of the rotors described above the lateral acceleration forces will have little or no effect on the running rate of the escapement mechanisms and gear train and will not appreciably effect the distance to arming of the missile. The cam slot 36 controls the rotary motion of the rotors 20 and 21 as hereinafter described.

A pair of side rails 40 secured to the top plate 23 on each side by screws 41 or other suitable means provide a guide-way for the sliding weight 37 mounted on the top plate 23 and a plurality of elongated V grooves (see FIG. 4) in the side rails 40 and in the edges of the sliding weight 37 provide a bearing surface for nylon balls 43.

The sliding weight 37 commonly known in the art as a setback or G weight has an abutment 45 protruding at its forward end and is held in its forward position by the latch mechanism 46. The latch 46 is pivotably mounted on a shaft 47 and pivots about shaft 47 to release the sliding weight 37 upon firing of the dimple motors 49 as hereinafter described.

A block member 50 is mounted on the rear ends of the upper and lower plates 23 and 24 and has a pair of spaced apart guide pins 51 and 52 mounted thereon and projecting forwardly into the after end of the sliding weight 37. A pair of coil compression springs 53 are mounted on the guide pins 51 and 52 and are adapted to seat in recessed openings (not shown) in the rear end of the block 37 and react between the forward ends of the recessed openings and the forward end of the block 50 to restore the weight 37 to its forward position after acceleration forces have diminished. The part of the safety and arming device thus far described is essentially the same as disclosed in the Voida et al. application, Ser. No. 772,152 mentioned above.

The eccentrically weighted counter-rotating rotors 20 and 21 are controlled by the cam slot 36 on the sliding weight 37. Upon detonation of the dimple motor 49 the latch 46 will release the sliding weight 37 and as the missile is launched the longitudinal acceleration forces will force the sliding weight 37 aft and free the rotors 20 and 21 for rotation. The motor rotors 20 and 21 rotate under the control of the escapement mechanism for a predetermined time and upon missile motor burnout and cessation of longitudinal acceleration forces the sliding weight 37 will be returned to its forward position by reaction of springs 53 between this weight 37 and the block 50 and will snap the rotors 20 and 21 into the armed position.

With particular references to FIGS. 5 through 9 in which the schematic sketch of the essential components of the fuze and safety and arming device are disclosed in a sequence of operation, the power supply from the main missile power is distributed from the pin connector 59 to circuits for charging a capacitor 60 and to fire the dimple motors 49. The sliding weight 37 has a rod member 61 protruding forwardly therefrom that abuts against the leaf spring members of the brake switch 18 when the missile is at rest and acceleration weight switch 62 which is described hereinafter in detail has a ball 63 seated at its forward end.

Figure 5:
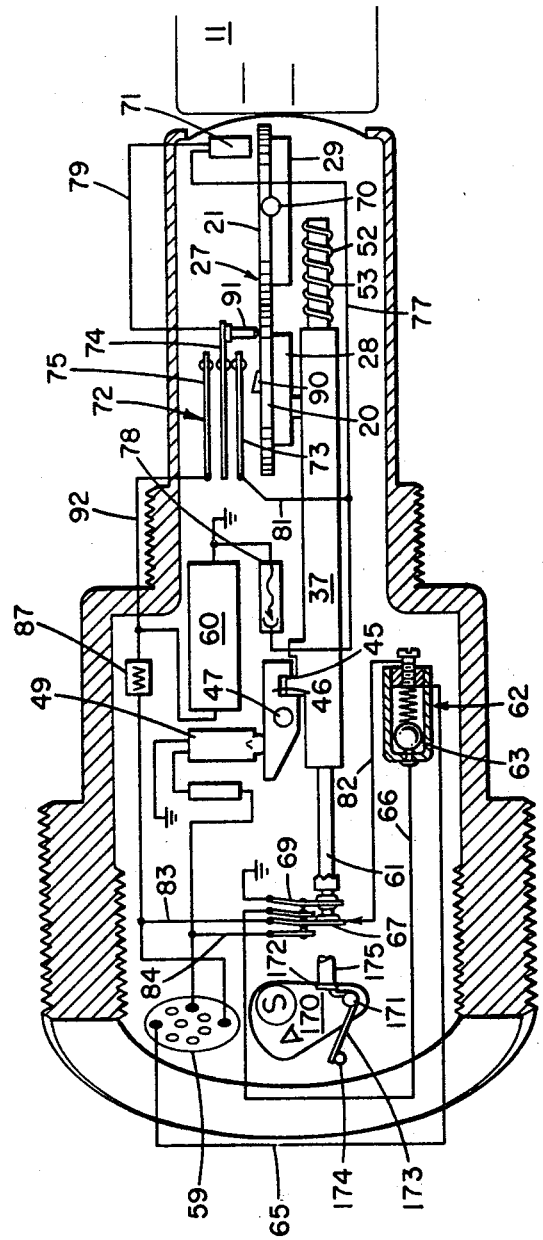
FIG. 5 is a schematic illustration of the fuse and safety and arming components before the missile is launched and acceleration forces are applied.
Figure 6:
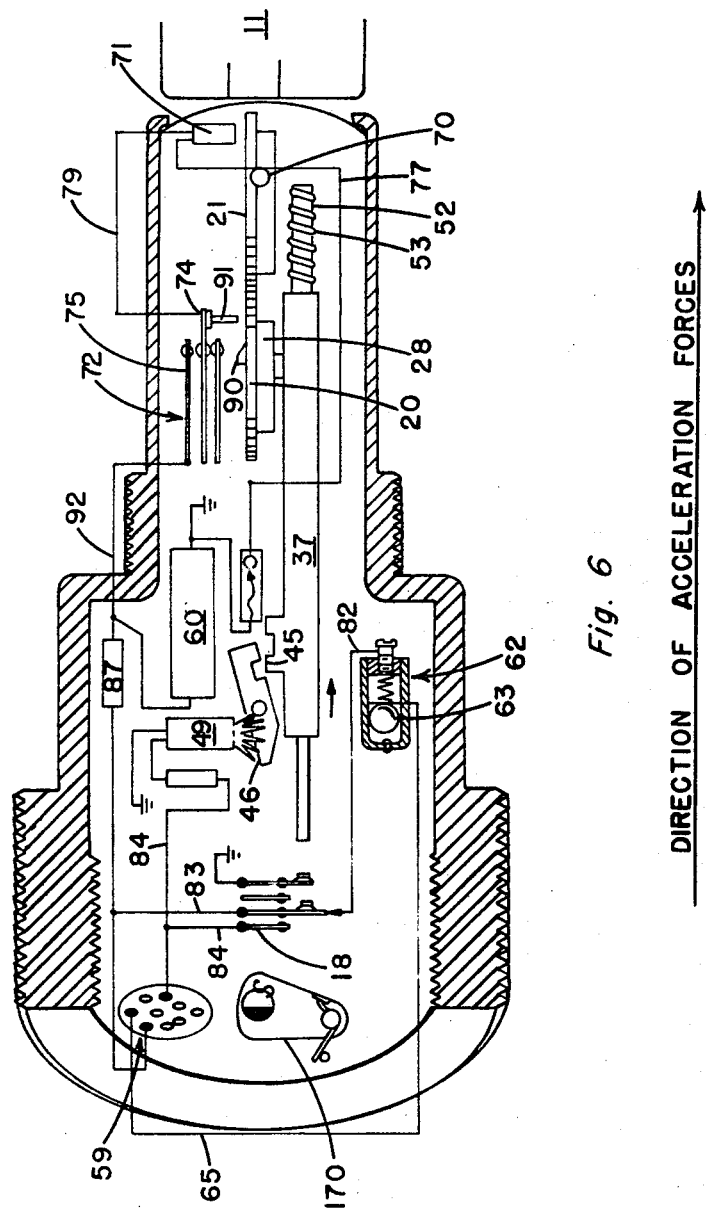
FIG. 6 is a schematic illustration of the components shown in FIG. 5 after the missile has been launched and the initial acceleration forces are sustained.

The missile power supply from the pin connector 59 is connected by lead 65 to the acceleration switch 62 and with the missile at rest and the ball 63 in its forwardmost position the power supply is connected to ground through the lead 66 and the leaf springs 67 and 69 of the brake switch 18. The rotor 21 has a detonator 70 mounted radially therein and when the missile is in its initial pre-launch position the rotors 20, 21 are in such a position that the detonator 70 is rotated out of line with the primer 71 which is the safe position of the missile. A cam operated arming switch 72 is provided (as shown in FIG. 5) above the forward rotor 20 and includes three leaf spring members 73, 74 and 75. A primer 71 when in the safe position is connected by a lead 77 to one of the trembler switches 78 and is further connected by lead 79 to the middle leaf spring 74 of the switch 72. The leaf spring 74 is in contact with the leaf spring 73 and is shorted out through lead 81 to the trembler switch 78.

Upon launching of the missile the ball 63 of the acceleration switch 62 moves aft under the influence of the longitudinal acceleration forces and connects the missile power supply from the lead 65 to the capacitor 60 and dimple motors 49 through the leads 83 and 84 respectively. The capacitor 60 is thus charged by the missile power supply and the dimple motors 49 are fired releasing the set-back weight 37 whereby the weight 37 under the influence of the longitudinal acceleration forces will move aft and opening the brake switch 18 whereby the dimple motors will be isolated and the power supply fed directly to the capacitor 60 to continue the charging. Also the rotors 20 and 21 will be released for rotation and will rotate under the influence of the longitudinal acceleration forces only and having their rate of rotation controlled by the escapement mechanism as described above.

Figure 7:
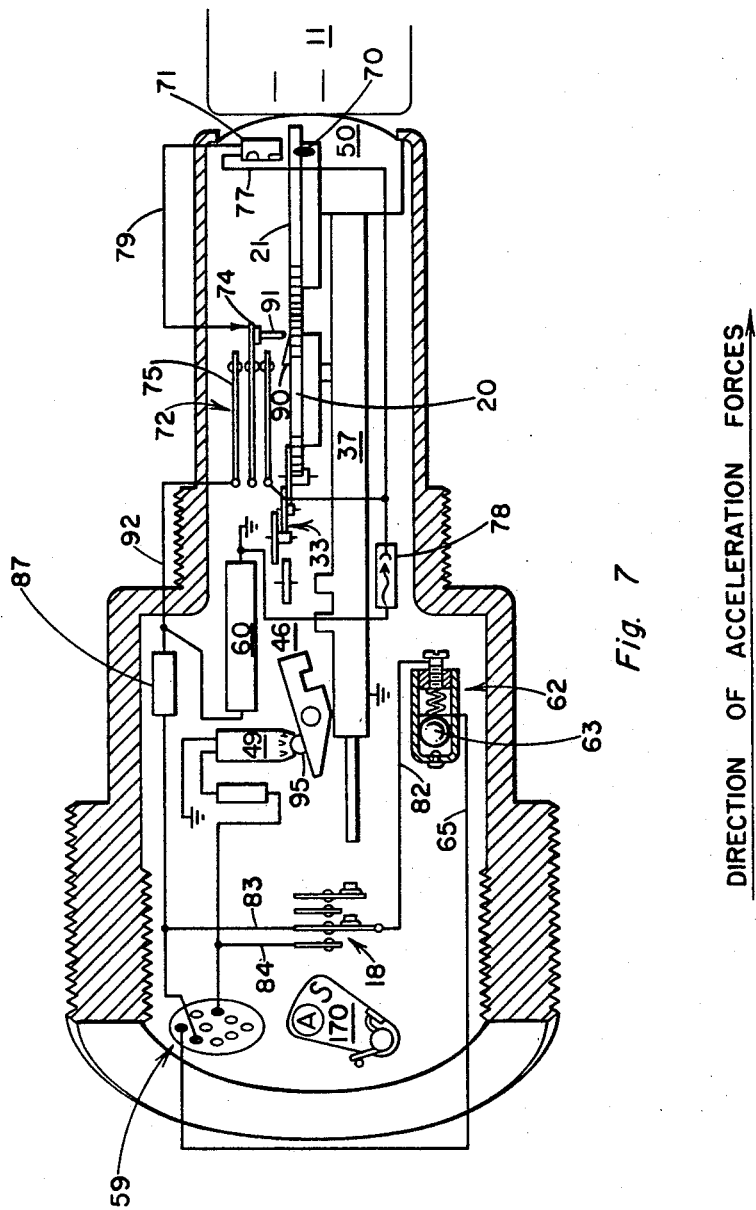
FIG. 7 is a schematic illustration of the components shown in FIG. 5 after acceleration forces have been sustained for a predetermined amount.

FIG. 7 represents the position when the setback weight 37 has reached its furtherest aft position and is abutted against the stop block 50 while the rotors 20 and 21 continue their rotation under the sustained action of the longitudinal acceleration forces. Furthermore dimple motors 49 have exploded and are now holding down on the forward part of the latch 46 to retain it in its cocked position and the power supply from the acceleration actuated switch 62 is applied to the capacitor 60 through the resistor 87.

Figure 8:
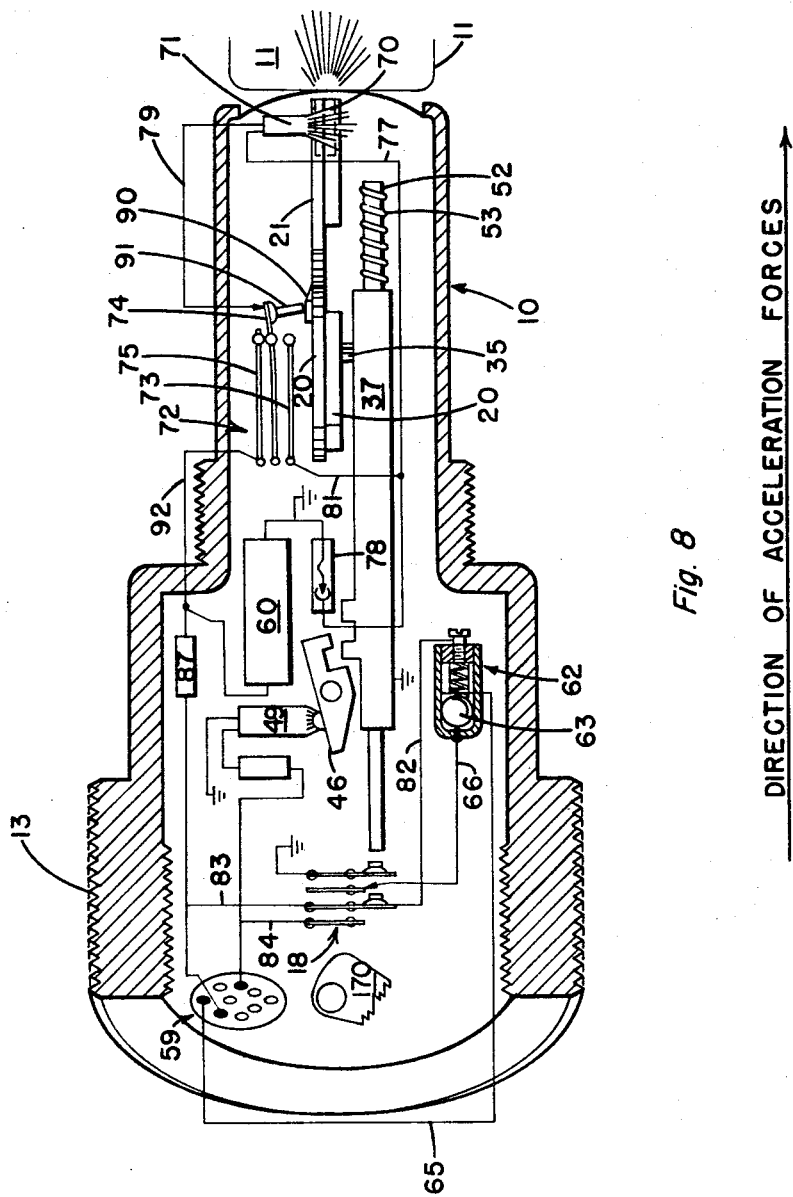
FIG. 8 is a schematic illustration of the components shown in FIG. 5 after acceleration forces have ceased and target impact has been acquired.

FIG. 8 represents the relative position of the sliding weights 37 and the rotors 20 and 21 after rocket motor burnout and the acceleration forces have decreased. The weight 37 has been returned by the spring 53 to a position just short of its foremost position and the rotors 20 and 21 have rotated to their completely armed position wherein the detonator 70 is in line with the primer 71. A cam member 90 mounted on the rotor 20 has rotated to a position wherein it will engage a pin member 91 mounted on the outer end of the leaf spring member 74 to complete the circuit from the capacitor 60 through primer 71, upper leaf 75 and a lead 92. Upon target contact the tremblor switch 78 will close due to the impact with the target and the circuit between the capacitor 60 and the primer 71 will be complete whereby the primer 71 will be detonated and in turn the detonators 70 and booster charger 11 will be ignited. The resistor 87 is of such value that the capacitor 60 will discharge through the primer 71 instead of back through the power supply of the missile in the event that the power supply for the missile is cut off prior to impact with the target.

Figure 9:
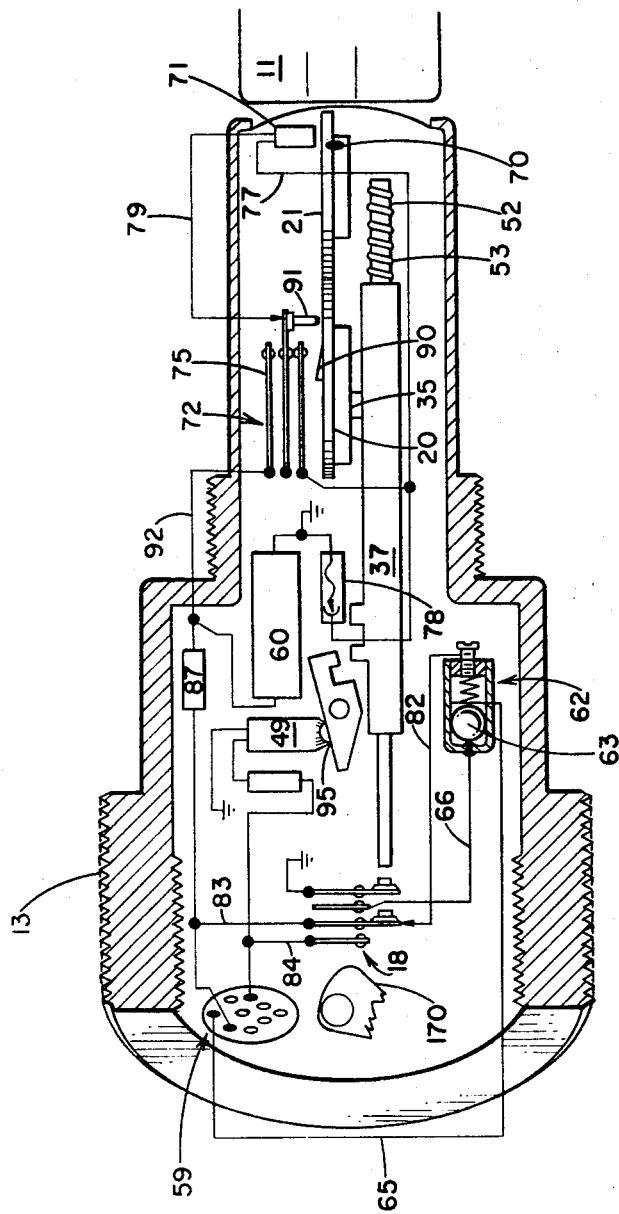
FIG. 9 is a schematic illustration of the components shown in FIG. 5 if the acceleration forces fail to be sustained a predetermined amount or impact with the target is made before the arming cycle is complete.

FIG. 9 however, illustrates the relative position of the rotors 20, 21, arming switch 72 and the setback weight 37 in the event that the rocket motor burns out prior to the time the missile has traveled to the safe arming distance or in the event that impact is made with the target prior to the time that the cycle is completed. The cam 90 on the rotor 20 has not rotated a sufficient distance to engage the pin 91 on the leaf 74, therefore, if the target is hit by the missile and closes the tremblor switch 78 the circuit to the primer 71 will not be completed with the capacitor 60. In the event the leaf spring 74 should engage the leaf 75 due to target impact the rotors 20, 21 are locked in such a position by the forward motion of the weight 37 that the detonator 70 will not be in line with the primer 71 and should the primer 71 explode the firing train would not be completed.

Figure 10:
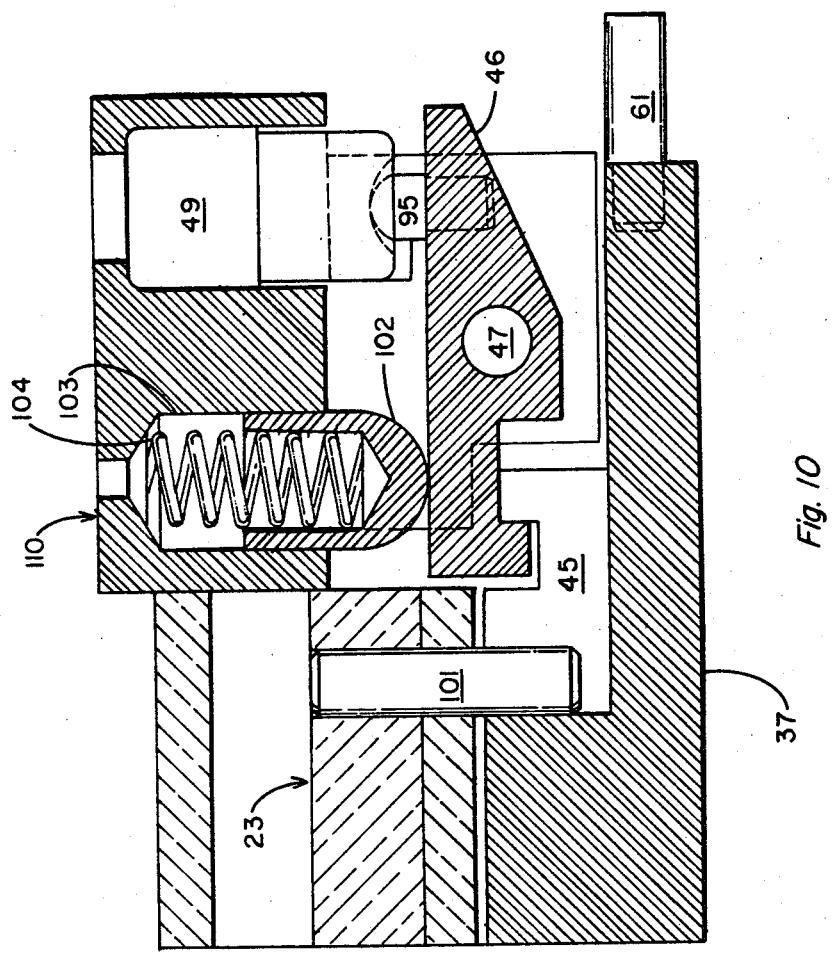
FIG. 10 is a cross sectional view taken along the center line of the dimple motor housing showing the dimple motor latch release.

FIG. 10 is a cross sectional view taken through the dimple motor housing 110 and showing the latch 46 and the sliding G weight 37 in their locked position. The latch 46 has at its forward end a pin 95 mounted therein and protruding into the recessed portion of the dimple motor 49. The latch 46 is held in engagement with the raised portion 45 of the sliding part 37 by means of a spring loaded pin member 102 which reciprocates within a bore 103 in the dimple motor housing 110 and is held in engagement with the latch 46 by spring member 104 reacting between the pin 102 and the bore 103. A stop pin 101 is mounted in the plate 23 to engage the sliding weight 37 and stop it in its forward position.

Figure 11:
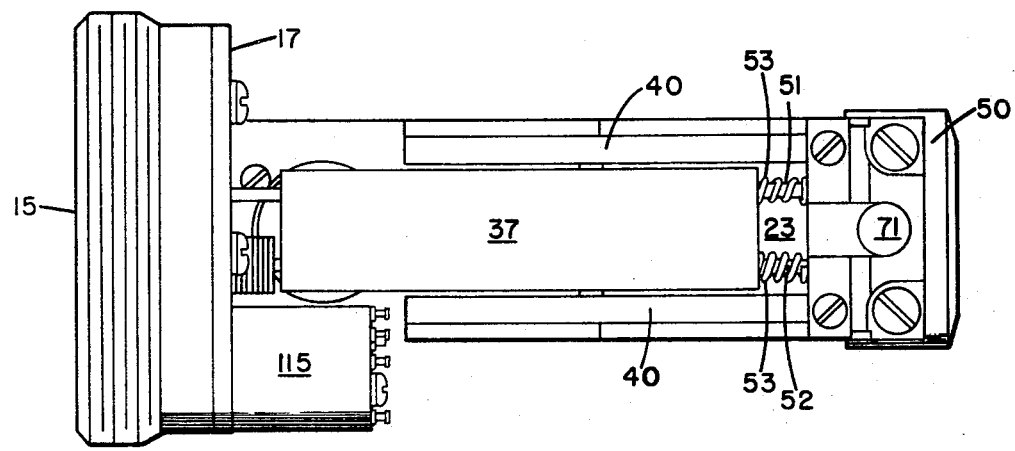
FIG. 11 is a top plan view of the fuse and safety and arming device removed from the case housing.
Figure 12:
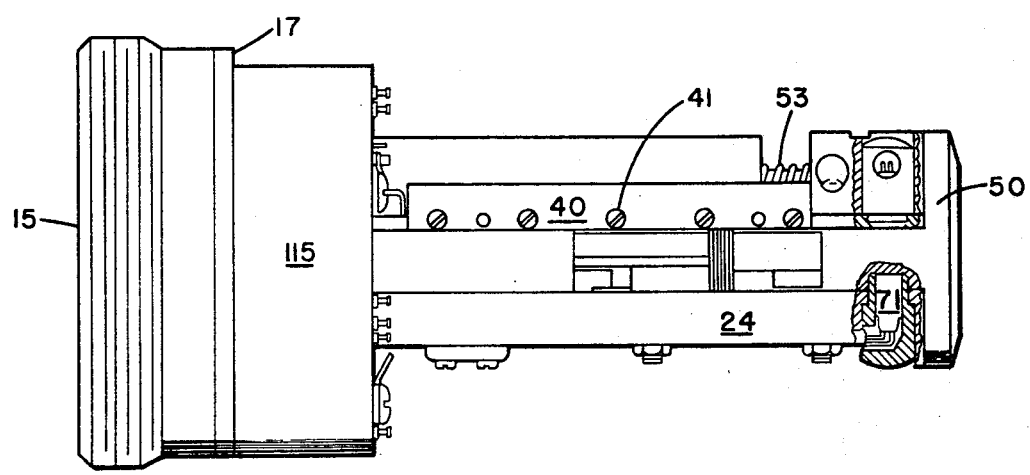
FIG. 12 is a side view of the safety and arming device removed from the case housing and illustrating the detonator therein.
Figure 13:
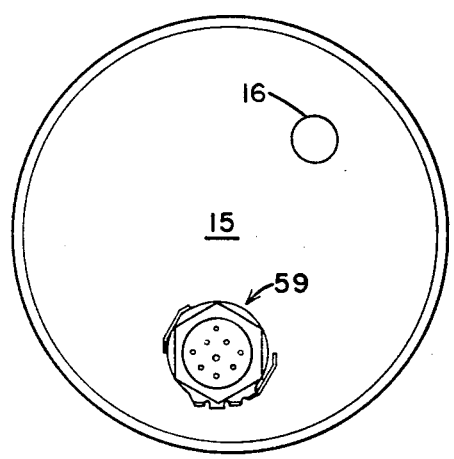
FIG. 13 is a front end view of the fuze and safety and arming device removed from the housing.

Although the electrical components capacitor 60 and the acceleration switch 62 and associated resistors are shown as mounted schematically within the fuze housing in FIGS. 5 through 9 they are actually mounted in a semicircular housing 115 around the periphery of the main body of the S and A just aft of the plate 17 as shown in FIGS. 11 and 12.

In place of the conventional tremblor switches 78 shown in FIGS. 5 through 9, the circuit between the capacitor 60 and the primer 71 could be completed by a nose impact switch.

Figure 14:
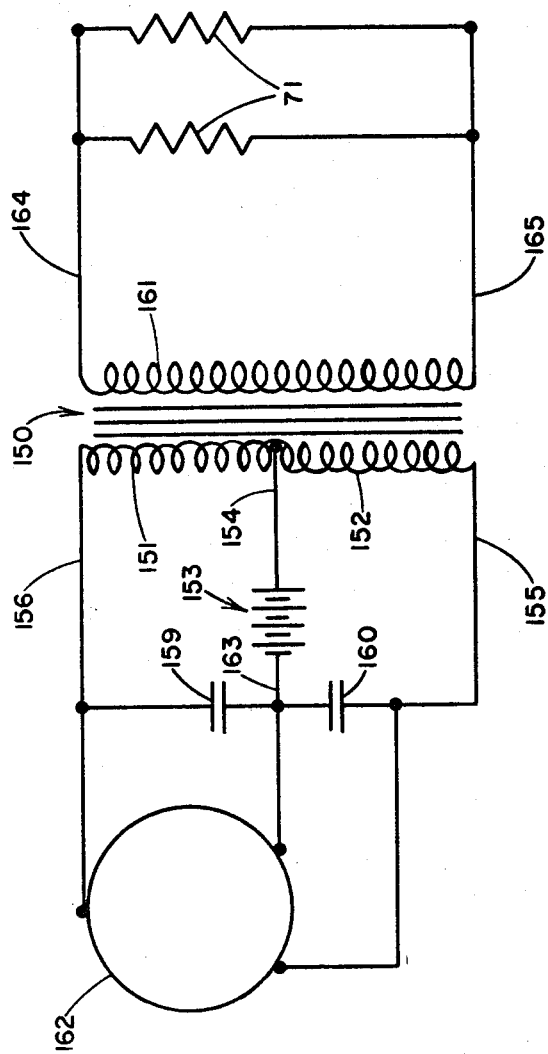
FIG. 14 is an electrical schematic sketch of an induction firing circuit for the primers.
Figure 15:
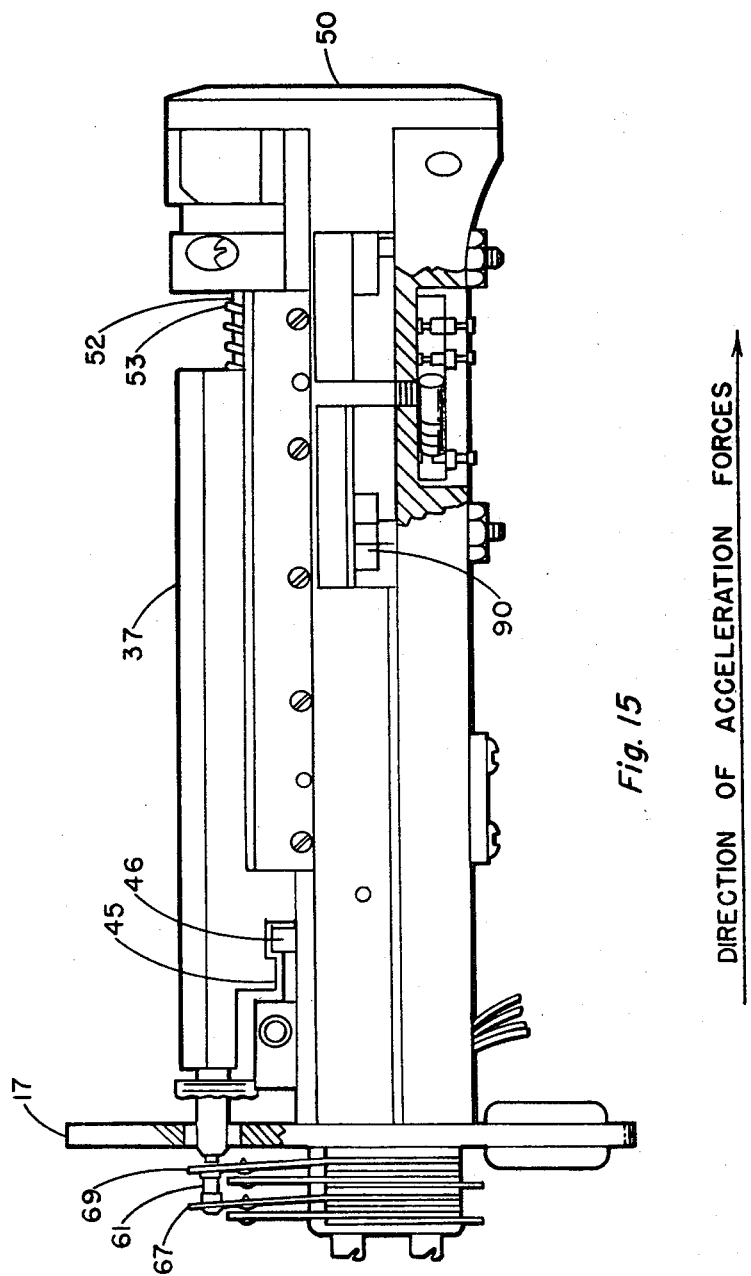
FIG. 15 is a side elevation view of the fuze and safety and arming device similar to FIG. 16 but with the front housing removed.
Figure 16:
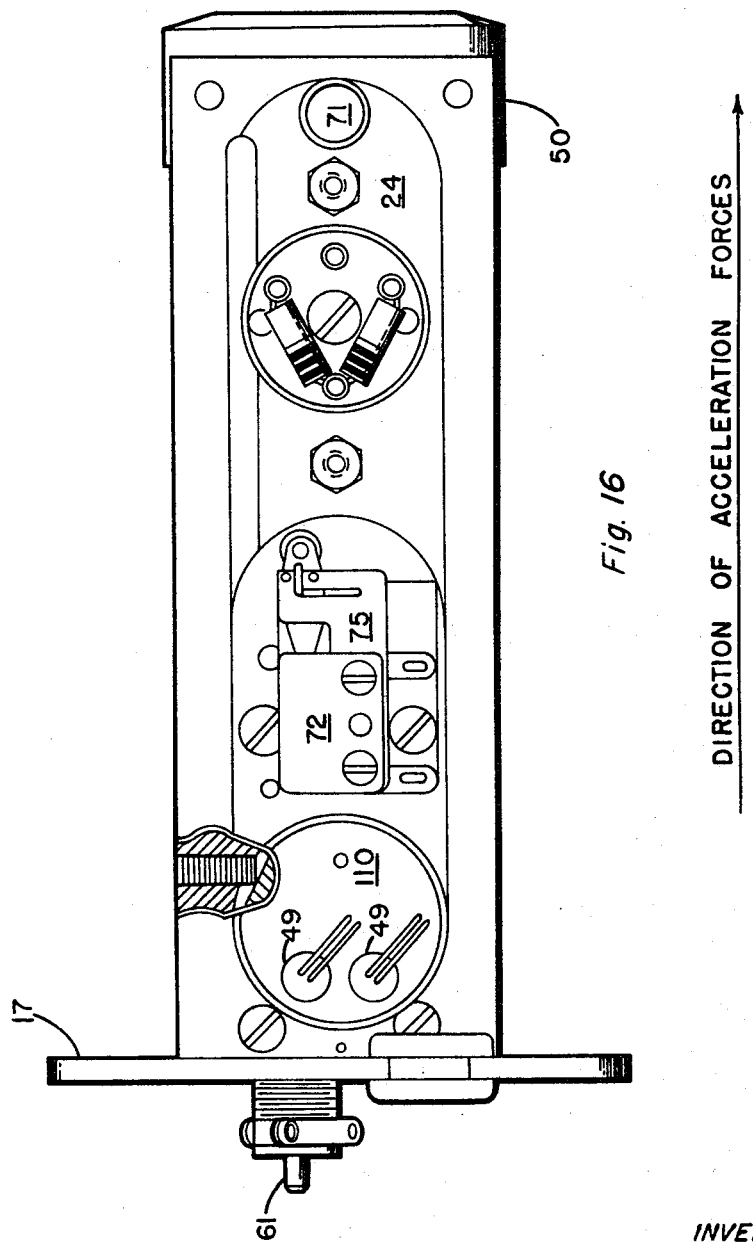
FIG. 16 is a bottom plan view of the fuze and safety and arming device removed from the case housing similar to FIG. 11 but with the front housing removed.
Figure 17:
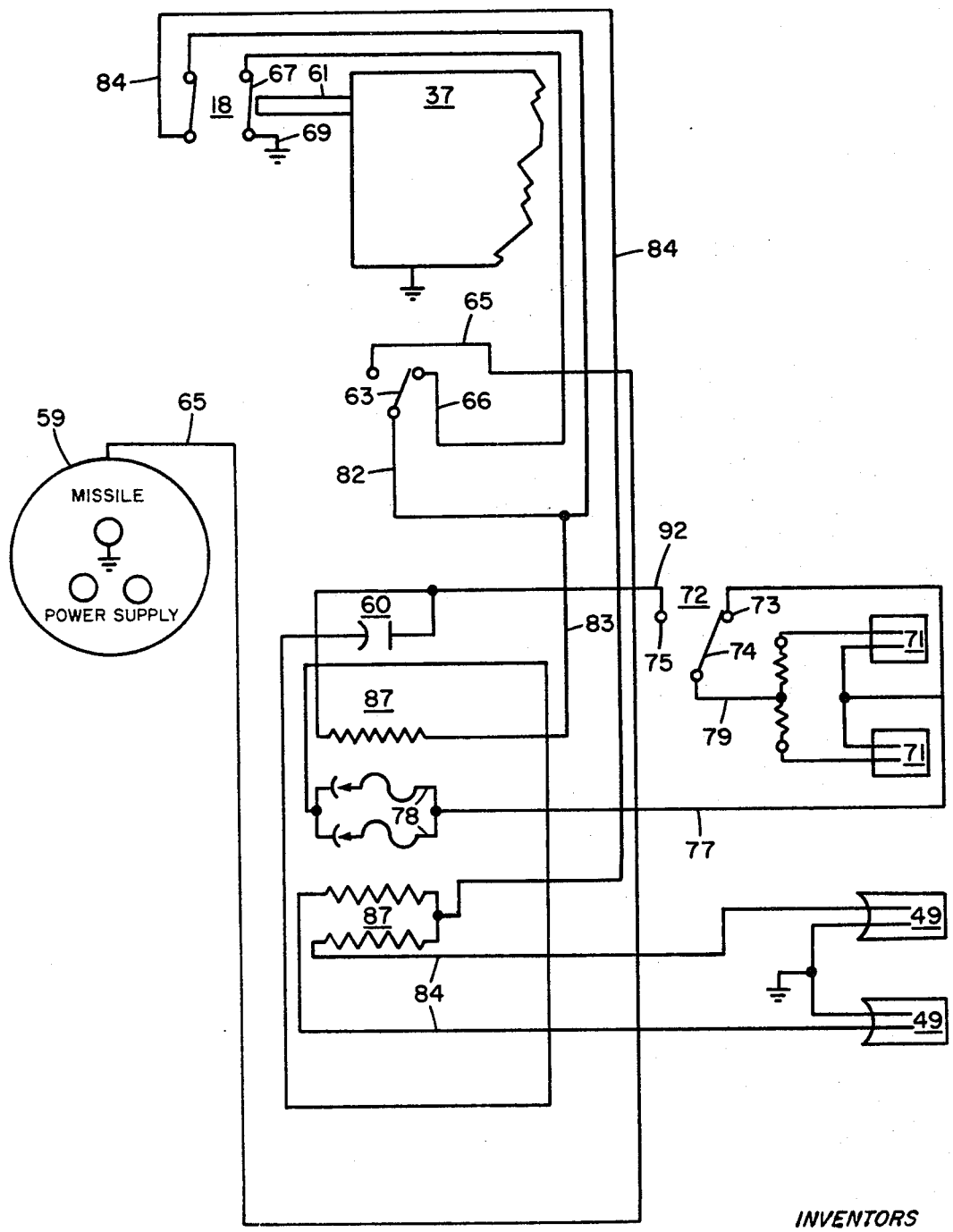
FIG. 17 is a schematic wiring diagram of the complete electrical fuzing system for the fuse and the safety and arming device wherein a tremblor switch is used for the firing circuit.

FIG. 14 illustrates another means of firing the primers without the use of the missile power supply and the capacitor 60. The transformer member 150 is mounted within the fuze and safety and arming device 10 and has a primary coil consisting of two windings 151 and 152 which are wound in opposite directions and the secondary coil 161. A power supply battery, which may be connected by any means during missile flight, 153 is also mounted within the fuze 10 and has a lead 154 as a center tap between the two coils 151 and 152. Lead 154 is connected to the positive pole of the battery 153 and the coil 151 is connected by the lead 156 with a ball contact 162 and a condenser 159. Coil 152 is connected by lead 155 to lead 163 and the ball contact 162. A lead 163 is connected to the negative pole of the battery 153, the condensers 159 and 160 and the ball contact 162. The primers 71 are connected across the leads 164 and 165 of the secondary coil 161. Prior to contact with the target the battery 153 will charge the condensers 159 and 160 and the current flowing through the coils 151 and 152 will set up fields in opposite direction. Through mutual induction the coils 151, 152 will set up two fields opposing each other through coil 161 so that no voltage will appear across the lines 164, 165. Ball contact 162 which is normally mounted in the missile nose cone will, upon target impact, move from contact with any of the three leads 155, 156 and 163 causing the field produced by either coil 151 or coil 152 to collapse. The relative flow of current from DC power supply 153 and conductor 154 divides at the primary coil center tap and flows in opposite directions through each half of the primary coil (i.e. from conductor 154 through half 151 of the primary coil, conductor 156, ball contact 162 and conductor 163 back to power supply 153; and, from conductor 154 through half 152 of the primary coil, conductor 155, ball contact 162 and conductor 163 back to power supply 153). Since the current flows in the primary coil in opposite directions from the center tap and because each of the halves 151 and 122 of the primary coil are wound in opposition the magnetic fields produced therein are additive. Therefore, when ball contact 162 moves from contact with any of leads 155, 156 and 163 at least half of the field produced will collapse producing a change of field flux. The change of field flux will induce a current in coil 161 to fire the primers 71.

Figure 18:
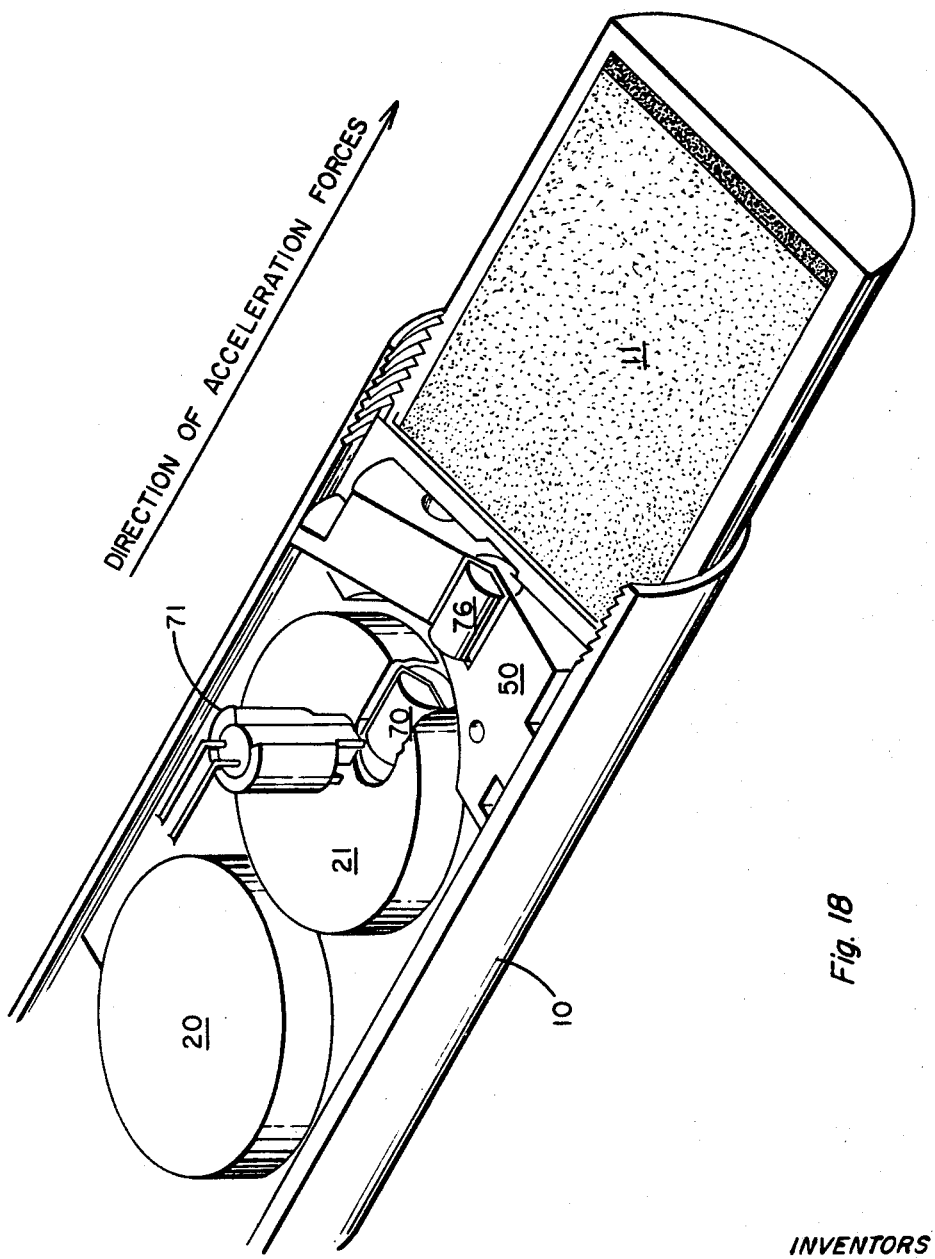
FIG. 18 is a pictorial cutaway view of the rotors and the explosive train.

Referring now to FIG. 18, the explosive train of the missile comprises a pair of primers 71 (only one of which is shown in FIG. 18) mounted in the top and bottom plates whereby the primers 71 are in line with the detonator 70 when the rotor 21 has been rotated to the armed position. A short tetryl lead 76 housed in the block 50 completes the explosive train by connecting the detonator 70 with the tetryl booster 11.

As noted above the relationship of the rotor pin 35 and the configuration of the cam slot 36 in the sliding weight 37 determine the commit point in the position of arming as the rotors 20 and 21 rotate from the safe to the armed position.

FIGS. 19a through 19g disclose one preferred embodiment of the cam slot 36 and the relationship of the pin 35 therein.

Figure 19A:
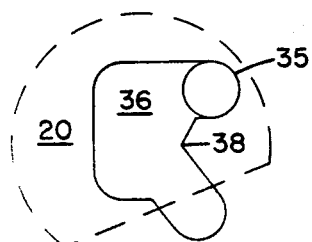
FIGS. 19a through 19g are schematic sketches of the preferred embodiment of the setback weight cam slot and the rotor cam action.
Figure 19B:
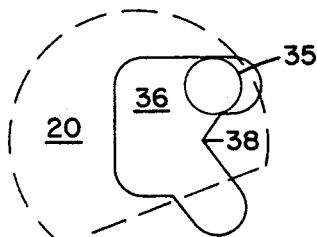

With reference to FIGS. 19a through 19g in FIG. 19a the sliding weight 37 is in its forward locked position and the rotors 20 and 21 are in their initial safe position. In FIG. 19b the weight 37 has been released by the explosion of the dimple motors 49 starting to move aft under the influence of the longitudinal acceleration forces, and the rotors 20 and 21 are held in their initial safe position by a leg of the cam slot 36 restraining the pin 35.

Figure 19C:
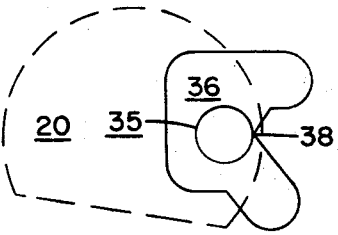
Figure 19D:
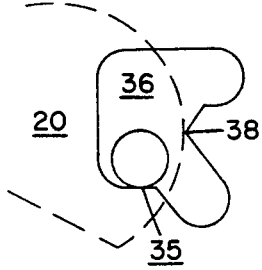

In FIG. 19c the rotors 20 and 21 have commenced to rotate to the commit point 38 which is reached when the minimum force required to arm the device is of sufficient duration to cause the rotors to rotate to the position shown and the sliding weight 37 has reached its furthest aft position. Any force of less duration would only partially rotate the rotors 20 and 21 and they would return to the safe position due to the cam action of the cam slot 36 upon cessation of longitudinal acceleration forces. In FIG. 19d the rotors 20 and 21 have rotated beyond the end of the gear train and the commit point 38 whereby the escapement mechanism is no longer in control of the rotors rotation.

Figure 19E:
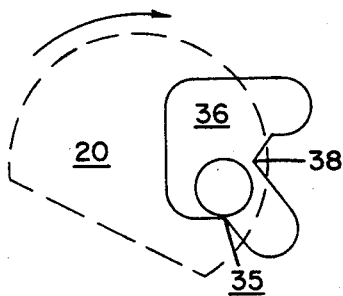

In FIG. 19e the rocket motor has burned out and cesstation of the acceleration forces has occurred. The sliding weight 37 has started to move forward under the influence of springs 53 and the rotors 20 and 21 have commenced their rotation without the control of escapement mechanism.

Figure 19F:
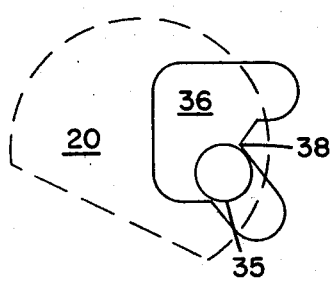
Figure 19G:
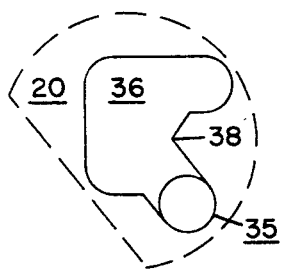
Figure 20:
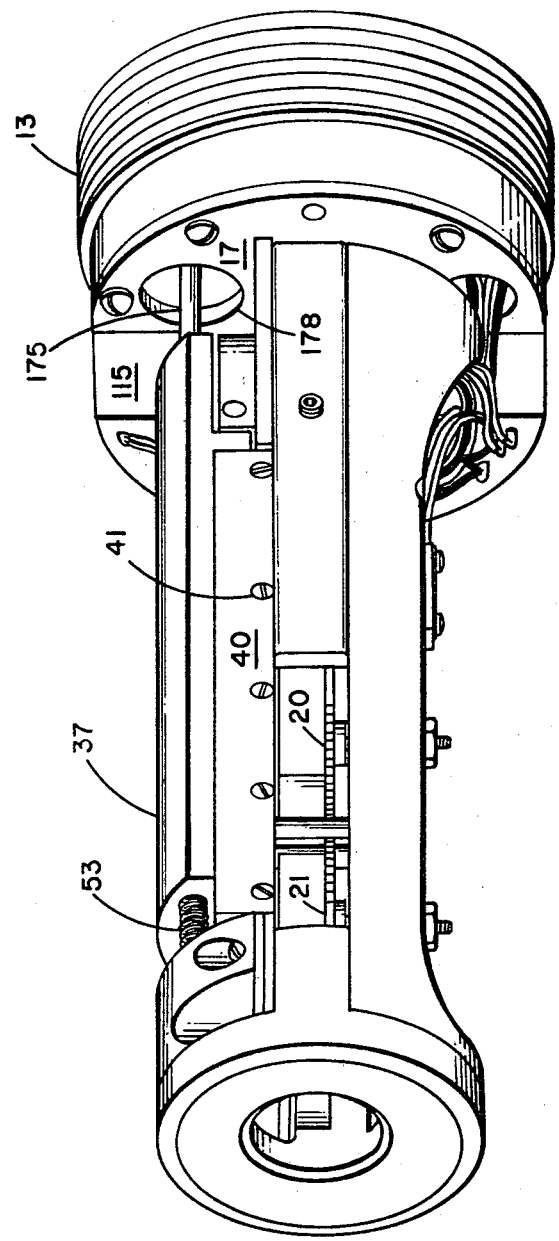
FIG. 20 is a pictorial side view of the complete fuze.

In FIG. 19f the sliding weight 37 is still in motion towards its foremost position and the pin 35 has rotated to a point substantially equal to its initial position in FIG. 19a. However, the rotors 20 and 21 are prohibited from rotating to the fully armed position until the sliding weight 37 has returned to its foremost position as shown in FIG. 19g and the leg of the cam slot 36 rotates the rotors 20 and 21 to the armed position. The detonator 70 is now in line between the primer 71 and the tetryl lead 76 to complete the explosive train.

Various means of indicating when the rotors 20 and 21 are in either a safe or armed position may be used, however, the preferred means disclosed in FIGS. 2, 5, 6, 7 and 13 is a stamped or painted S and A on a rotating cam member 170 which is mounted by a pin 171 for rotation on the plate 15. A shoulder flange 172 on the cam 170 reacts against a spring 173 wound around the pin 171 and abuts a pin 174 mounted on the inside of the plate 14. A rod 175 extends from the forward end of the sliding weight 37 through an aperture 178 in the plate 17 to engage the cam member 170 when the sliding weight 37 is in its initial forward position. The pin 175 holds the cam member 170 in the position whereby the S on the cam member is in line with an aperture or peep hole 16 in the plate 14 whereby indicating that the rotors 20 and 21 are locked in the safe and unarmed position. When the sliding weight 37 is released by the dimple motors 49 and moves aft under the influence of the acceleration forces and the rotors 20 and 21 are free to rotate from the safe to the armed position, the cam 170 will be released by the rod 175 and will react to the spring 173 whereby the A for the armed position will appear in the aperture 16 of the plate 15.

Obviously many modifications and variations of the present invention are possible in light of the above teaching; it is therefore to be understood that within the scope of the appended claim the invention may be practiced otherwise than as specifically described.

We claim:
1. A contact fuze for missiles having longitudinal and lateral acceleration forces due to steering of the missile in flight including a firing circuit, a safety and arming means comprising a set back weight responsive to acceleration forces along the longitudinal axis of said missile and a pair of eccentrically weighted geared together rotors adapted to rotate in opposite directions about their pivots in response to acceleration forces along the longitudinal axis of said missile and tending to rotate about said pivots in the same direction in response to lateral acceleration forces, an explosive element mounted in one of said rotors for movement from an unarmed to an armed position and an impact responsive means operably connecting said firing circuit and said explosive for detonating said explosive element when in said armed position upon target acquisition, said firing circuit comprising a mutual inductance means including a primary and a secondary coil, said primary coil being center-tapped and having one-half thereof wound in opposition to the other half thereof, electrical conducting means connecting said secondary coil across said explosive element, a DC power supply having one terminal thereof connected to the center-tap of said primary coil, said impact responsive means including a ball contact switch separately connecting said DC power supply from its other terminal across each half of said primary coil such that the relative current flow in each half of said primary coil will be in opposite directions and one condenser connected from said other terminal to one end of said primary coil and a second condenser connected from said other terminal to the other end of said primary coil, whereby a current is generated in said secondary coil to detonate said explosive element when upon target impact said ball contact moves from contact with any connection to said primary coil and DC power supply.

References Cited

UNITED STATES PATENTS

| | | | |
|---|---|---|---|
| 2,443,041 | 6/1948 | Jordan | 102—70.2 |
| 2,710,578 | 6/1955 | Rabinow | 102—70.2 |
| 2,764,091 | 9/1956 | Hudson et al. | 102—70.2 |
| 2,797,911 | 7/1957 | Montgomery | 264—1 |
| 2,809,586 | 10/1957 | Roberts | 102—70.2 |
| 2,856,853 | 10/1958 | McGinnis | 102—70.2 |
| 2,887,056 | 5/1959 | Perret | 102—70.2 |

FOREIGN PATENTS 1,060,073   11/1953   France.

OTHER REFERENCES

Article by H. E. Wimperis appearing in March 1930 issue of Aircraft Engineering, entitled "The Measurement of Accelerations," pp. 53 and 54.

SAMUEL FEINBERG, *Primary Examiner.*

ARTHUR M. HORTON, *Examiner.*

W. J. CURRAN, L. L. HALLACHER, T. H. WEBB, *Assistant Examiners.*